United States Patent [19]
Strasser et al.

[11] Patent Number: 5,258,967
[45] Date of Patent: Nov. 2, 1993

[54] METHOD AND APPARATUS FOR SEPARATING A FIRST OPTICAL CONTROL RADIATION FROM A SECOND OPTICAL CONTROL RADIATION IN A READ/WRITE HEAD FOR USE IN AN OPTICAL STORAGE AND RETRIEVAL SYSTEM

[75] Inventors: Thomas A. Strasser, Ithaca; Mool C. Gupta, Webster, both of N.Y.

[73] Assignee: Eastman Kodak Company, Rochester, N.Y.

[21] Appl. No.: 840,213

[22] Filed: Feb. 24, 1992

[51] Int. Cl.$^5$ ................................................ G11B 7/09
[52] U.S. Cl. .................................. 369/44.23; 369/110; 369/112
[58] Field of Search ..................... 369/13, 44.12, 44.23, 369/47–48, 50, 112, 124, 110, 121, 122; 385/6–8, 10, 14, 31, 39, 130–132; 250/201.5

[56] References Cited

U.S. PATENT DOCUMENTS

| | | |
|---|---|---|
| 4,672,187 | 6/1987 | Fujita et al. . |
| 4,868,803 | 9/1989 | Sunagawa et al. . |
| 4,945,525 | 7/1990 | Yamamoto et al. ............. 369/44.12 |
| 5,146,080 | 9/1992 | Opheij ........................... 369/44.12 X |

*Primary Examiner*—W. R. Young
*Attorney, Agent, or Firm*—William W. Holloway

[57] ABSTRACT

In the read/write head of an optical storage system, a bi-direction grating coupler is used to replace optical components normally found in the read/write head. The use of the bi-directional grating coupler reduces the bulk and weight of the read/write head. The two channels of the bi-directional grating coupler can be used to separate a radiation component that can used to provide a tracking control signal from a radiation component that can be used to provide a focus control signal. One of the channels is also used to provide the radiation component from which the data on the storage medium can be identified. The bi-directional coupler can be implemented by two grating couplers, each grating coupler having a thin film associated therewith and each grating coupler diverting a selected radiation portion into the associated thin film. The bi-directional grating coupler can be implemented using a single grating with tapered thin film surfaces, the taper separating the selected radiation components into selected portions of the thin film. The tapered thin film surface broadens the wavelength response of the associated grating. In either embodiment, a reflection diffraction grating can be inserted in the optical path to compensate for shifts in the radiation wavelength.

15 Claims, 6 Drawing Sheets

METHOD AND APPARATUS FOR SEPARATING A FIRST OPTICAL CONTROL RADIATION FROM A SECOND OPTICAL CONTROL RADIATION IN A READ/WRITE HEAD FOR USE IN AN OPTICAL STORAGE AND RETRIEVAL SYSTEM

BACKGROUND OF THE INVENTION

1. Field of Invention

This invention relates generally/to the read/write heads used to generate and analyze the radiation beam which interacts with the storage medium in optical information storage and retrieval units. In particular, a bi-directional grating coupler is used to couple to the radiation in such a manner as to provide, when processed, tracking control and focus control signals.

2. Description of the Related Art

Referring now to FIG. 1, a typical read write head used in the interaction of an optical information and retrieval system with a storage medium is shown. Radiation source/collimator 11 provides a collimated beam of radiation. The radiation beam is applied to polarizing beam splitter 12 which provides a substantially linearly polarized beam of radiation. The polarized beam of radiation is passed through quarter wave plate 13, and focused on the storage medium 15 by lens 14. The radiation reflected from the storage medium is recollimated by lens 14 and the recollimated radiation is applied to the polarizing beam splitter 12. The linearly polarized radiation beam, having been rotated 90° by the double passage through the quarter wave plate, is reflected by polarizing beam splitter 12 and applied to beam splitter 16. The radiation beam passing through the beam splitter 16 is focussed by lens 18 on detector 19. Detector 19 has stops 19A and 19B associated therewith which can provide the signals which can be used for information retrieval and for tracking control. The light reflected from beam splitter 16 is passed through lens 17 and applied to detector 18. Detector 18 includes stops 18A and 18B which provide a signal for controlling the focussing of the radiation beam on the storage medium. As will be clear to those skilled in the art, the detector relating to tracking control and the detector related to related focus control provide signals which, after appropriate processing, control servo-motors determining the radial position of the radiation focused on the disk and determining the distance of the focusing lens from the disk storage medium. In addition, at least one detector generates an information bearing signal which can be processed to identify the data stored on the optical storage disk in the form of variations in optical properties.

However, in spite of the success of the optical read/write heads, a need has been felt for apparatus and a method for providing a functionality equivalent to that found in a typical optical read/write head such as is shown in FIG. 1 while decreasing the bulk and weight of the read/write head. Recently, the use of holographic optical elements and diffraction gratings have been studied in a attempt to replace the optical components which are currently used to implement the read/write head. These newly considered elements can result in higher performance read/write optical heads with lower access times and reduced cost. A need has been felt for a read/write head configuration that effectively incorporates these newly considered elements.

SUMMARY OF THE INVENTION

The present invention is directed to overcoming one or more of the problems set forth above. Briefly summarized, according to one aspect of the present invention, dual grating couplers are used in the optical read/write heads to provide two thin film layers. Each thin film provides a channel for information bearing radiation. tracking and focussing signals. The dual grating couplers can replace optical elements used in read/write heads of the prior art. In particular, the bulky and relatively heavy beam splitters can be partially or completely eliminated. According to another aspect of the present invention, a diffraction grating is provided with a thin film into which radiation reflected from a storage medium is coupled. The thin film is fabricated with at least on tapered surface in the region of the grating. The tapered surface divides the thin film into two separate channels into which is coupled information bearing radiation. The problem of the wavelength dependence of the coupling angle can be accommodated, in the second aspect of the invention, at least partially by the taper of the thin film over the diffraction grating. The wavelength dependence of the incident angle can be accommodated by insertion of a compensating diffraction grating in the radiation path. In either aspect of the invention, at least one of the channels can be used to couple to a radiation component from which the information stored on the disk can be determined.

These and other aspects, objects, features and advantages of the present invention will be more clearly understood and appreciated from a review of the following detailed description of the preferred embodiments and appended claim, and be reference to the accompanying drawings.

DESCRIPTION OF THE PREFERRED EMBODIMENTS

1. Detailed Description of the FIGS.

Figure 1:
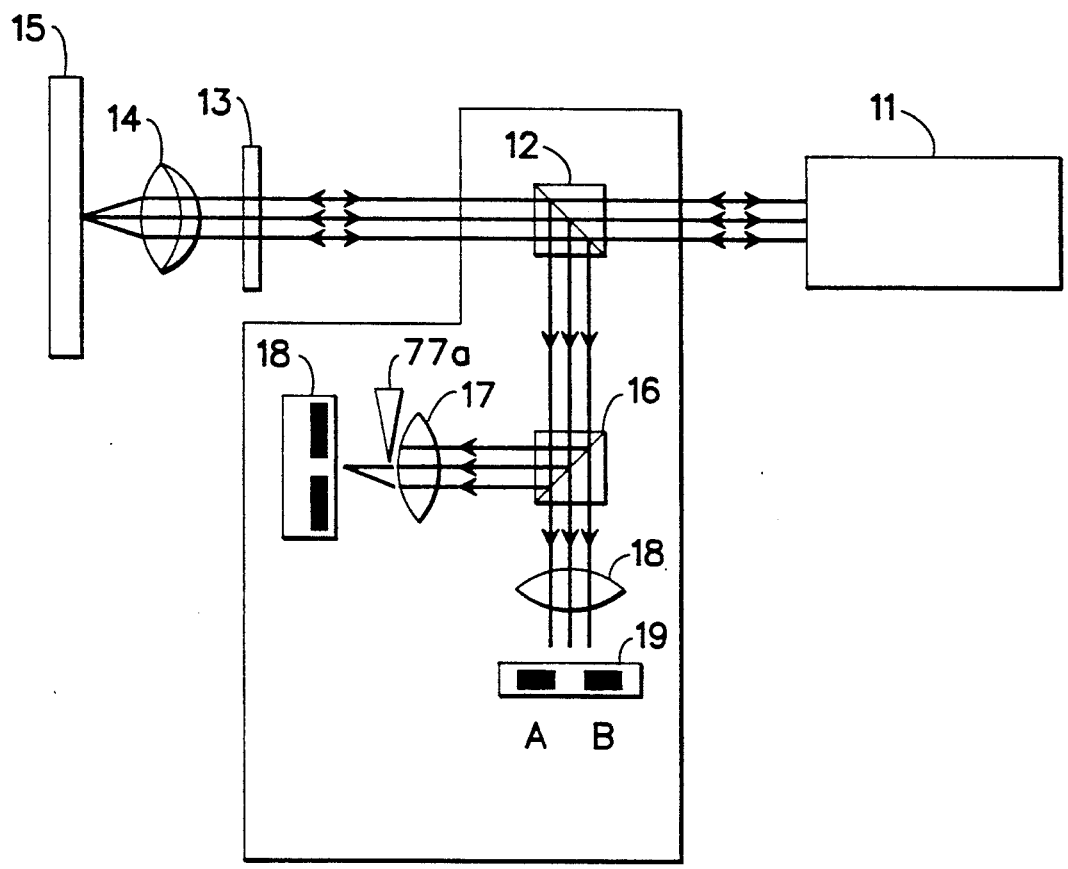
FIG. 1 is a block diagram of a read/write head typically used in an optical storage and retrieval system along with the storage medium with which the read/write head interacts.

FIG. 1 has been discussed with respect to the prior art.

Figure 2:
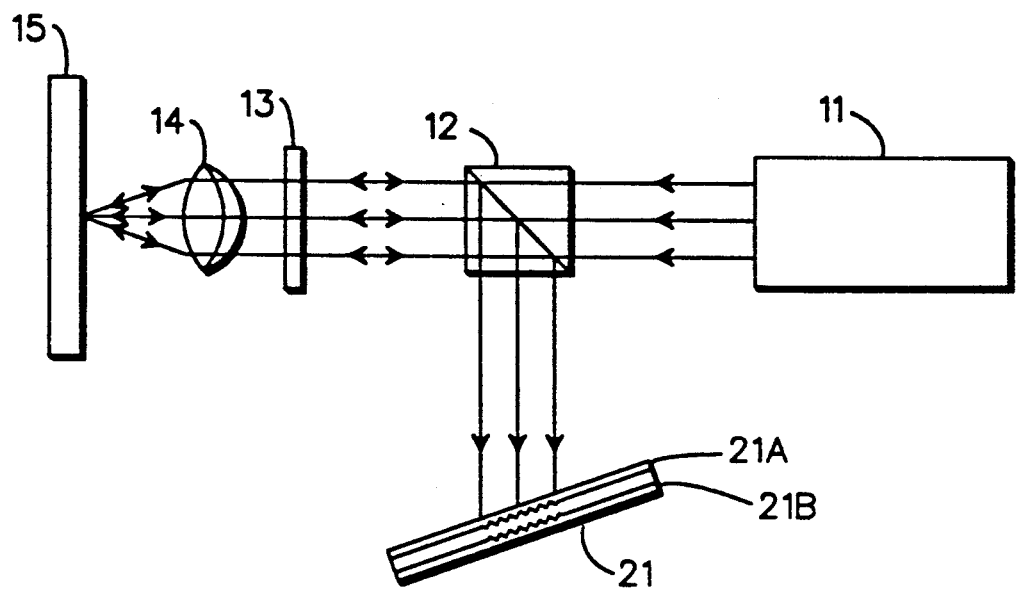
FIG. 2 is a block diagram of a read/write head in an optical storage system in which the analyzing beam splitter of FIG. 1 is replaced by a dual grating coupler.

Referring to FIG. 2, a read/write head for an optical system in which the analyzing beam splitter 16 of FIG. 1 is replaced by a dual grating coupler is shown. A radiation source 11 which includes a collimating element is applied provides a collimated beam of radiation which is applied to a polarizing beam splitter 12. The collimated and polarized radiation beam is transmitted through a quarter wave plate 13, focused by a lens 14 on the optical storage medium. The radiation beam reflected from the storage medium is recollimated by lens 14, transmitted through the quarter wave plate, and applied to polarizing beam splitter 12. The radiation beam reflected by the polarizing beam splitter 12 is applied to dual grating coupler 21. The dual grating coupler 21 has a first surface layer with a grating fabricated therein. Radiation of appropriate wavelength, polarization, and angle of incidence impinging on the grating can be captured in the layer 21A and the layer will act as a wave guide for the radiation. A second layer 21B has radiation transmitted through layer 21A applied thereto and, with appropriate parameters for a grating fabricated in the layer 21A, radiation is captured in the layer 21B. With optical stops and positioning of detector, layer 21A can facilitate detection of a signal having tracking information imposed thereon and layer 21B can facilitate detection of a signal with focussing information imposed thereon. The radiation component from which the stored information can be identified is included in the radiation signal coupled into at least one of the grating coupler films.

Figure 3:
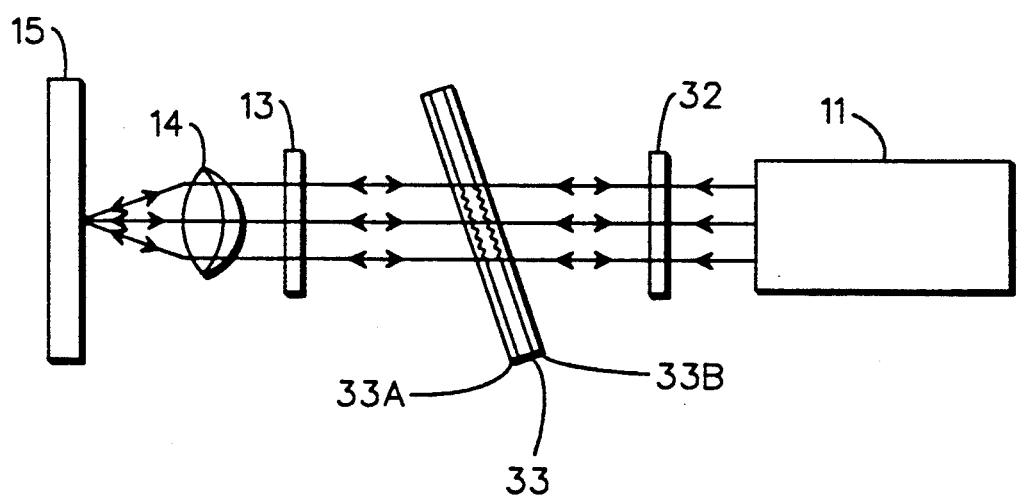
FIG. 3 is a block diagram of a read/write head in which optical components in the dotted line region of FIG. 1 are replaced by a dual grating coupler.

Referring to FIG. 3, a second embodiment for a read/write head for an optical storage and retrieval unit according to the present invention is shown. A radiation source 11, including a collimating element, applies a collimated radiation beam to polarizer 32, the polarizer taking the place of the polarizing beam splitter in FIG. 1. The linearly polarized radiation beam is then transmitted through a dual grating coupler 33. The radiation beam transmitted through the dual grating coupler is passed through the quarter wave plate 13 and focused by lens 14 on the medium 15. The radiation reflected from the storage medium 15 is recollimated by lens 14 and transmitted through the quarter wave plate 13. When the beam is applied to the dual grating 33, the grating associated with the front surface film 33A causes radiation which includes the tracking signal modulation to be trapped in the front thin film. With appropriate stops for the radiation detector(s), not shown, the tracking signal can be extracted from the radiation captured by the film 33A. The radiation component not captured or scattered by film 33A is applied to film 33B. The radiation beam portion having the radiation with focusing information is captured by means of the grating fabricated in the surface of film 33B. By means of appropriate optical stops, a plurality of radiation portions focus signals can be isolated in the grating coupler and applied to detection apparatus.

Figure 4:
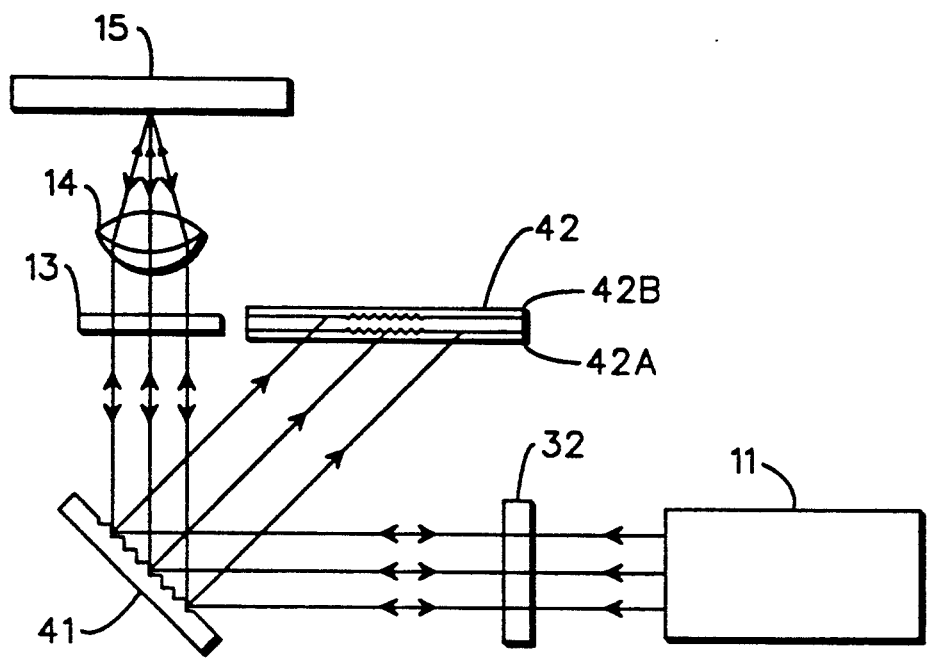
FIG. 4 is a block diagram of a third embodiment of a read/write head for an optical storage and retrieval using a dual grating coupler.

Referring to FIG. 4, another embodiment of a read/write head suitable for use in an optical storage system is shown. A radiation source 11 including a collimating element transmits a collimated radiation beam through polarizer 32 and applies the linearly polarized beam to surface relief reflection grating 41. The polarized radiation beam is reflected from the surface relief reflection grating, transmitted through quarter wave plate 13 and focused by lens 14 on storage disk 15. Radiation reflected from the storage media 15 is recollimated by lens 14 and applied to surface relief reflection grating The reflection grating 41 and dual grating coupler 42 are positioned and oriented so that the radiation applied to reflection grating 41 is directed toward the dual grating coupler 42 at an angle so that a portion of the radiation is captured in layer 42A by a grating fabricated therein and a portion is captured in layer 42B by a grating structure fabricated in the layer 42B. The radiation captured in layer 42A can include modulations relating to the read/write head tracking. The radiation captured in layer 42B can have imposed thereon information related to the focus of the radiation on the storage media.

Figure 5:
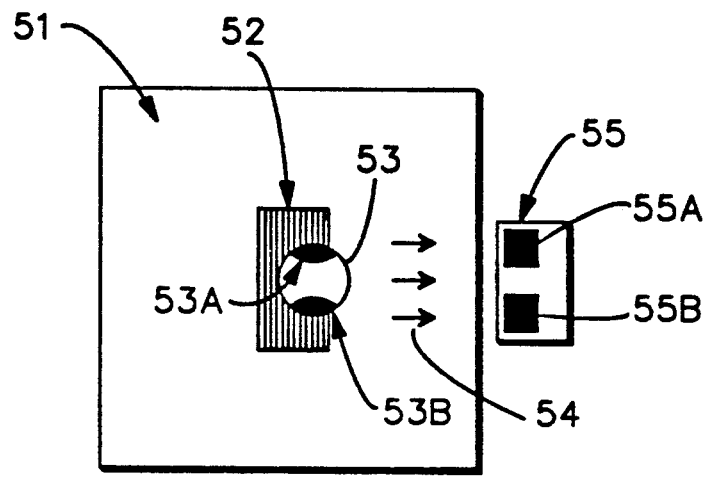
FIG. 5 is a block diagram illustrating how a grating the associated thin film channel can be used in the detection of a signal which is used in controlling the tracking of the storage path on the optical storage medium.

Referring to FIG. 5, the configuration of a grating coupler in detecting signal used in the tracking of a data path on an optical storage medium is shown. The coupler film 51 has a grating 52 fabricated therein. The collimated radiation 53 is applied to the grating and a portion of the radiation 54 is captured in the film 51. The regions 53A and 53B of radiation beam 53 will vary as the radiation beam impinging on the disk optical storage medium substrate deviates from being centered on the information path. The captured radiation is applied to split field detector 55. Each detector 55A and 55B are associated with regions of the radiation field 53A and 53B which vary as the information path tracking becomes compromised. In order to provide a signal to control the tracking, a difference of the signals provided by detectors 55A and 55B is used. The signal from the data stored on the disk can be detected by summing the output signals from split field 55a and 55B along with appropriate signal processing apparatus.

Figure 6:
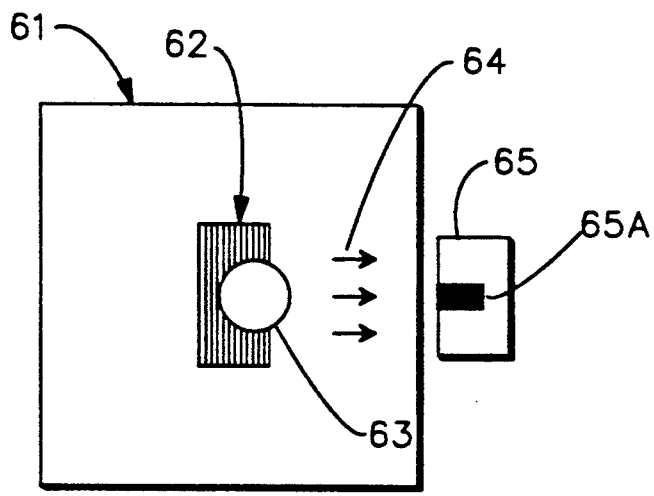
FIG. 6 is a block diagram illustrating how a grating co the associated thin film channel can be used in the detection of a signal which is used in controlling the focussing of a radiation beam on the optical storage medium.

Referring to FIG. 6, the use of the grating coupler in the detection of the signal used in controlling the focus is shown. The thin film 61 has a grating 62 fabricated therein. When the collimated radiation beam is applied to the grating, a portion of the radiation 64 is captured in the film 61. The captured radiation is applied to detector 65. The detector 65 is positioned to have a portion of the radiation which does not vary a significantly when the tracking is being compromised. In particular, when the radiation beam applied to the optical storage medium is focused, the signal at detector 65A will be a maximum. It will be clear that examination of the derivative of the focus signal will identify in which direction the lens must be moved to correct the focus.

Figure 8:
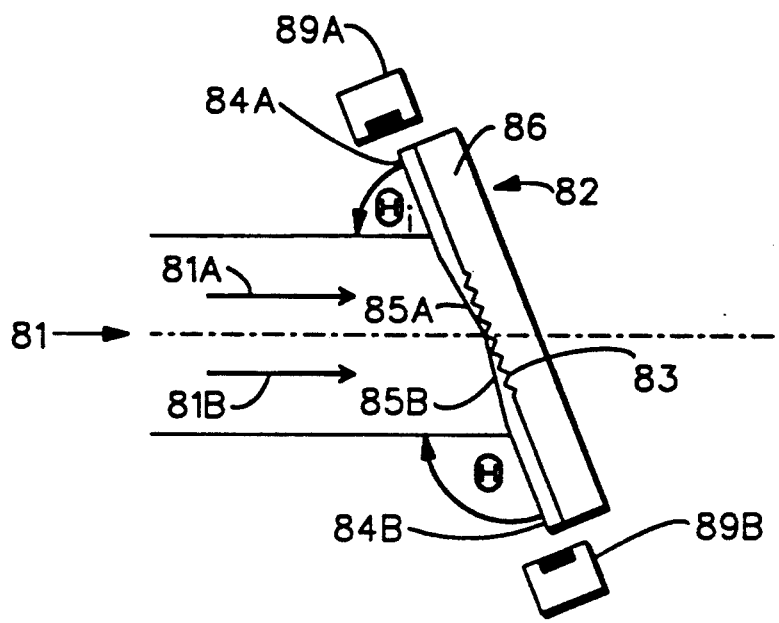
FIG. 8 is a cross sectional view of tapered grating coupler suitable for replacing a beam splitter in a read/write head of an optical information bearing storage and retrieval unit.

Referring to FIG. 8, the cross-sectional view of a bi-directional tapered grating coupler suitable for separating portions of the reflected radiation beam is shown. The grating coupler 82 includes a substrate 86, a diffraction grating 83 fabricated on the substrate 86, and a thin film 84 which provides the channel into which the radiation beam is diverted. The thin film 84 includes tapered surfaces 85A and 85B. The tapered surfaces effectively divides the thin film into two regions, 84A and 84B. A radiation beam 81 impinging on the diffraction grating when the angle $\Theta_i$ is appropriate to the parameters of the grating will diffracted into the thin film layer. However, the taper results in a portion of the radiation beam 81A being diffracted only into thin film region 84A, while a second portion of the radiation beam 81B is diffracted into thin film region 84A. The portion of the radiation beam diffracted into thin film region 84A is trapped in this channel until the radiation exits from the grating coupler and is detected by radiation detector 89A. Similarly, the portion of the radiation beam 81B diffracted into thin film region 84B is conducted through this thin film region and exits in such a manner to interact with radiation detector 89B. As will be clear from the previous discussion, radiation beam portion 81A can be selected to provide, for example, information relating to the tracking of the beam interacting with the storage medium, while the portion of the radiation beam 81B can be used to provide, for example, information relating to the focussing of the radiation beam on the storage medium. The tapered surfaces 85A and 85B of the grating coupler 82 result in the angle $\Theta_i$ having a less critical dependence on the wavelength of the impinging radiation. For some applications, no further compensation for wavelength changes, resulting for example from changes in the operating conditions of a laser diode, is required.

Figure 9:
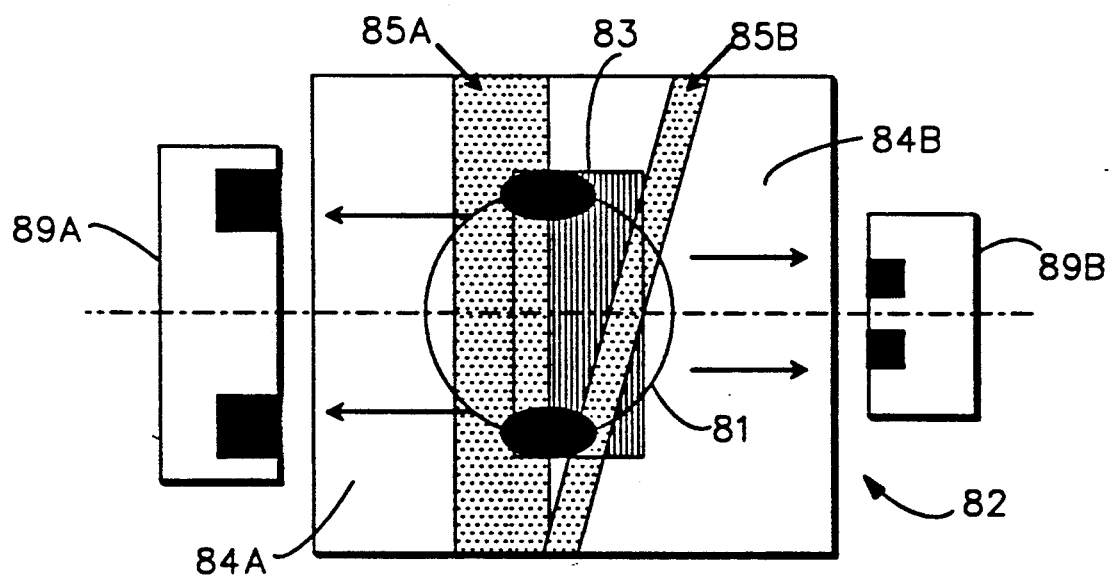
FIG. 9 is a frontal view of one implementation of a tapered grating coupler according to the present invention.

Referring to FIG. 9, a frontal view of a tapered surface grating coupler 82 providing a different perspective on the configuration shown in FIG. 8. The radiation beam 81 impinges on the diffraction grating 83 and radiation components are diffracted into thin film regions 84A and 84B, the thin film regions being defined by tapered surfaces 85A and 85B, respectively. The radiation coupled into the thin film regions 84A and 84B is channeled to and interacts with radiation detectors 89A and 89B, respectively. The detectors 89A and 89B are split field or two element detectors. In this manner, two signals are detected for each radiation portion permitting generation of an error (or control) signal based on the difference between the two detector signals. The spatial relationship between subportions of the impinging radiation and the radiation channeled in the thin film is maintained by the grating coupler, permitting signals to be generated by the detectors 89A and 89B which can control the focus and the tracking of the read/write head of an optical information storage system.

2. Operation of the Preferred Embodiment

The advantages of the read/write heads implemented with the present invention compared with the read/write heads of the prior art are illustrated by the comparison of FIG. 2, FIG. 3, FIG. 4, FIG. 8 and FIG. 9 with FIG. 1. The number of relatively bulky and heavy beam splitters can be reduced or even eliminated as well as reducing the number of elements for which alignment is necessary.

Figure 7:
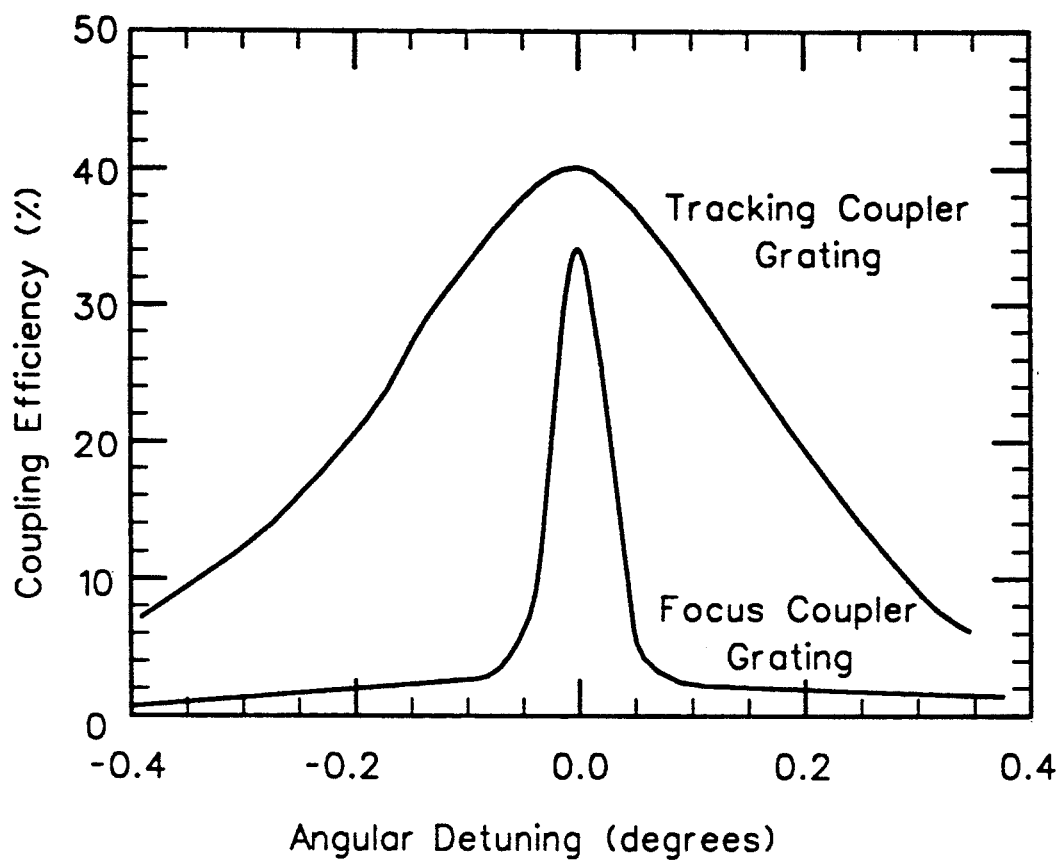
FIG. 7 is an experimentally measured plot of the angular of the radiation coupling to the wave guides in the double grating coupler configuration.

With specific reference to FIG. 2, a reflection diffraction grating can be used between the beam splitter and the dual grating coupler to compensate for changes in the radiation source. With specific reference to FIG. 3, the quarter wave plate 13 is optional, the change in orientation being detected by the grating 33. Similarly, the polarizer 32 serves only to prevent radiation from returning to the radiation source 11. With specific reference to FIG. 4, the reflection diffraction grating can be used to correct for changes in the wavelength In addition to the advantages generally associated with holographic optical elements, diffraction gratings, and integrated optics, the use of the grating couplers have unique properties which are appropriate for use in the read/write head of the optical storage unit. The grating couplers can have small periods (typically 400 nm) and relatively shallow depths (typically 100 nm). A grating coupler with small periods does not allow any diffraction orders in air which are near the coupling angle for capture by the wave guide. Only one diffraction order is typically allowed and this diffraction order has a large angle of incidence ($>40°$). The depths of the coupler gratings are shallow due to their fabrication in thin (15–200 nm) film structures. The allowable grating depth is restricted to be much less than the film thickness to maintain similar wave guide properties through out the film. The angular coupling relationship for grating couplers in optical wave guides is given by the equation $$sin(\Theta_i) = n_{eff} - m\lambda/d$$

where d is the grating period, neff is the effective refractive index, and $\Theta_i$ is the angle of incidence with the grating coupler. The coupling of the radiation with the film occurs over a relatively narrow angular range. Referring to FIG. 7, the coupling efficiency of the two grating coupler as a function of deviation from the optical coupling angle is shown. As will be clear from examination of this FIG, the angle of the grating with respect to the impinging radiation is relatively narrow. Coupling efficiency has been found to be dependent on defocus, size, and lateral offset of the incident radiation beam. These dependencies can be important. for example, in a correctly designed grating coupler, the beam defocus can be detected by the intensity of light coupled into wave guide.

The tracking signal coupler is sensitive to coupling efficiency due to beam size or defocus effects. The tracking signal coupling efficiency should be insensitive to the defocus and beam size effects. The change in the radiation beam size resulting from defocus problems can be a problem because the changes are not symmetric with respect to the difference detectors and the resulting signal may be interpreted as a tracking problem. This problem can be addressed by minimizing the distance between the focusing lens and the grating. In addition, the tracking coupler should be less sensitive to angular defocus than the focus grating coupler. This relationship will permit the servo mechanism to keep the radiation beam in focus and thereby maintain the dat signal.

With specific reference to FIG. 9, it will be clear to those skilled in the art of grating couplers that the tapered region 85B below the center line in FIG. 9 will generally be ineffective in coupling the radiation into the grating coupler 82, the tapered region not extending over the edge of the grating 83 below the center line. The tapered region 85B illustrated in FIG. 9 can be replaced with a tapered region fabricated only above the center line (and over the edge of the grating 83) in order to direct the radiation impinging on the grating coupler above the dashed center line toward upper detector element of split field detector 89B. However, the tapered regions that extend over only half of the grating coupler 82 are relatively difficult to fabricate. It is more convenient to fabricate a tapered region over an entire gating coupler, but inclined to avoid the edge of the grating over the grating region where radiation coupling is not desired.

It will be now appreciated that there has been presented a read/write head suitable for use in an optical storage unit which, through the use of dual grating couplers, are more compact and lighter than the typical read/write heads in the optical storage systems.

While the invention has been described with reference to a disk type storage medium it is apparent that the invention is easily adapted to other types of optical storage medium. While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. For example, the dual grating can be implemented using two separate grating couplers, rather than positioning the two films on a single substrate.

As is evident from the foregoing description, certain aspects of the invention are not limited to the particular details of the examples illustrated, and it is therefore contemplated that other modifications and applications will occur to those skilled in the art. It is accordingly intended that the claim shall cover all such modifications and applications as do not depart from the true spirit and scope of the invention.

What is claimed is:

1. A read/write head for use in an optical storage and retrieval system; said read/write head comprising:
   a polarizer in a path of collimated radiation to provide a linearly polarized radiation;
   a quarter wave plate receiving radiation from said polarizer;
   a lens for focusing said radiation from said quarter wave plate on a surface, said lens recollimating radiation reflected from said surface, the recollimated and reflected radiation passing through said quarter wave plate in an opposite direction; and
   a dual grating coupler positioned and oriented to be coupled to said reflected and recollimated radiation, wherein radiation coupled in a first grading coupler of said dual grading coupler is processed to provide a first control signal, wherein radiation coupled to a second grading coupler of said dual grating coupler is processed to provide a second control signal.

2. The optical read/write head of claim 1 wherein said polarizer is a beam splitter, said beam splitter positioned and oriented to direct said reflected and recollimated radiation to said dual grating coupler.

3. The optical read/write head of claim 1 wherein said polarizer is said dual grating coupler.

4. The optical read/write head of claim 1 further comprising a reflection diffraction grating reflecting said linearly polarized radiation toward said quarter wave plate, said reflection diffraction grating diffracting said reflected and recollimated radiation toward said dual grating coupler.

5. The optical read/write head of claim 1 wherein said first control signal is a tracking signal and said second control signal is a focus signal.

6. The optical read/write head of claim 5 wherein at least one of said radiation coupled in said first grating coupler and radiation coupled in said second grating coupler can be processed to provide a signal indicative of optical properties of regions of said surface.

7. In a read/write head of an optical storage and information system, a method of separating focus radiation capable of providing focus control signals from tracking radiation capable of providing tracking control signals, said method comprising the steps of:
   collimating and polarizing radiation from a radiation source to provide a collimated and polarized radiation;
   transmitting said collimated and polarized radiation through a quarter wave plate to provide a transmitted radiation;
   focusing said transmitted radiation to provide a focused radiation and reflecting said focused radiation from a surface of an optical storage medium to provide a reflected radiation;
   recollimating and retransmitting said reflected radiation through said quarter wave plate to provide a recollimated radiation and a retransmitted radiation; and
   applying said retransmitted radiation to a dual grating coupler oriented at a coupling angle to said retransmitted radiation, wherein a layer of a first grating coupler of said dual grating coupler has first radiation coupled thereto which is processed to provide tracking control signals, a layer of a second grating coupler of said grating coupler having second radiation coupled thereto which is processed to provide focus control signals.

8. The method of claim 7 wherein said polarizing step includes a step of transmitting collimated radiation through a beam splitter; and, wherein said applying step includes a step of reflecting said recollimated radiation with said beam splitter.

9. The method of claim 7 wherein said transmitting step includes a step of directing said collimated and polarized radiation toward quarter wave plate by reflection from a reflection diffraction grating, and wherein said applying step includes a step of applying said retransmitted radiation by diffraction from said reflection diffraction grating.

10. A read/write head used in the interaction with an optical storage medium, the read/write head having a polarizing apparatus linearly polarizing collimated radiation to provide a polarized radiation, a quarter wave plate through which said polarized radiation is transmitted to provide a transmitted radiation, a focusing element for focusing said transmitted radiation to provide a focused radiation, reflecting means for reflecting said focused radiation from a surface of an optical storage medium, said focusing element recollimating said reflected radiation and retransmitting said radiation through a quarter wave plate to provide a retransmitted radiation, wherein said read/write head is characterized by comprising:
   a dual grating coupler positioned and oriented for receiving said retransmitted radiation, a first grating coupler coupled to radiation which can be processed to provide a tracking control signal, a second grating coupler coupled to radiation which can processed to provide a focus control signal.

11. The read/write head of claim 10 wherein said first and second grating couplers each have optical stops for defining a region of said retransmitted radiation to be processed by said each grating coupler.

12. The read/write head of claim 10 wherein said dual grating coupler implements said polarizing apparatus.

13. The read/write head of claim 10 wherein said dual grating coupler implements said quarter wave plate.

14. The read/write head of claim 10 wherein said polarizing apparatus is a beam splitter, said beam splitter reflecting said retransmitted radiation onto said dual grating coupler.

15. The read/write head of claim 10 wherein said read/write head is further characterized by a reflection grating, said reflection grating reflecting said polarized radiation onto said quarter wave plate, said reflection grating diffracting said retransmitted radiation onto said dual grating coupler.

* * * * *